Feb. 16, 1971  D. A. G. MARSHALL  3,563,828
FLUID FILTERS
Filed June 14, 1968  3 Sheets-Sheet 1
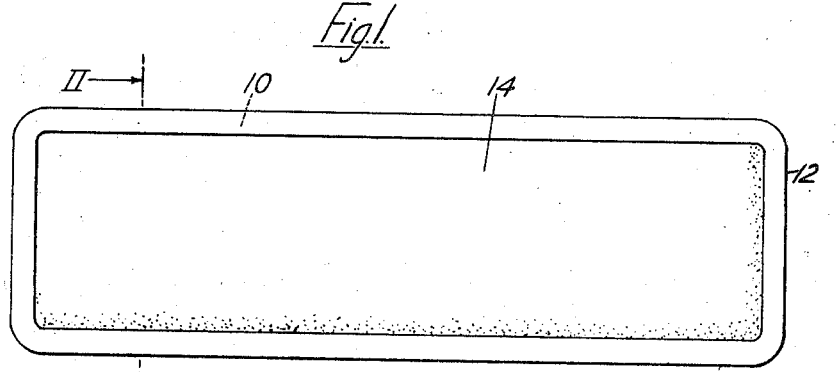
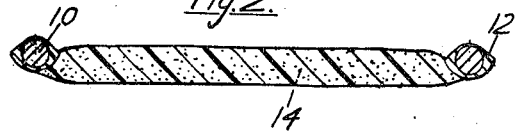
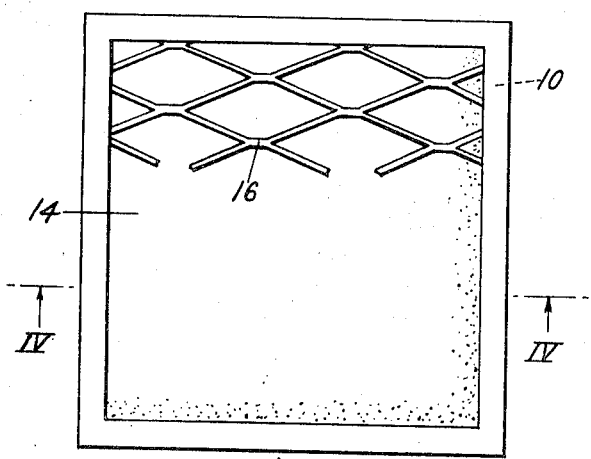
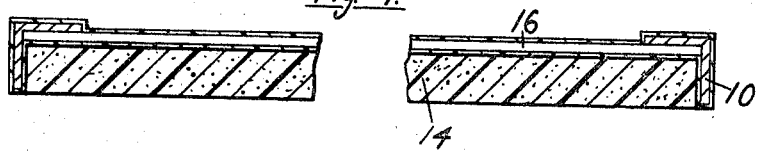
Inventor
DENNIS A. G. MARSHALL,
By
Attorneys.

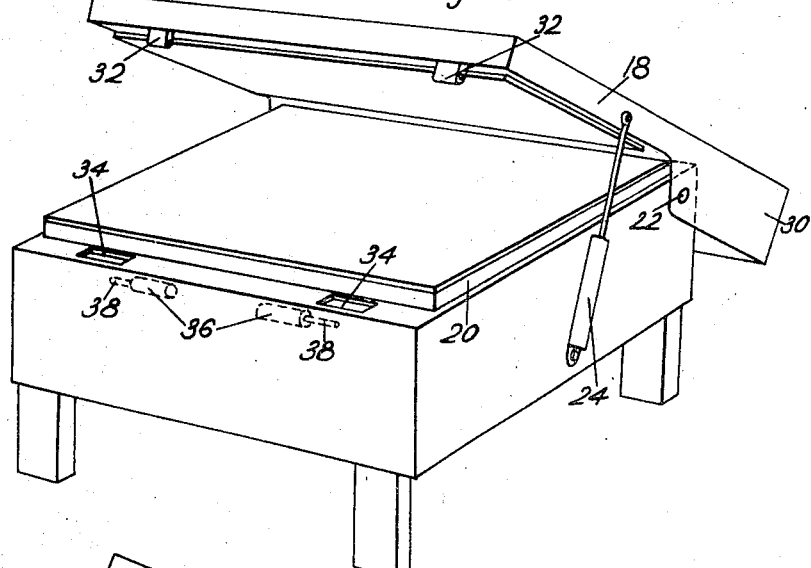
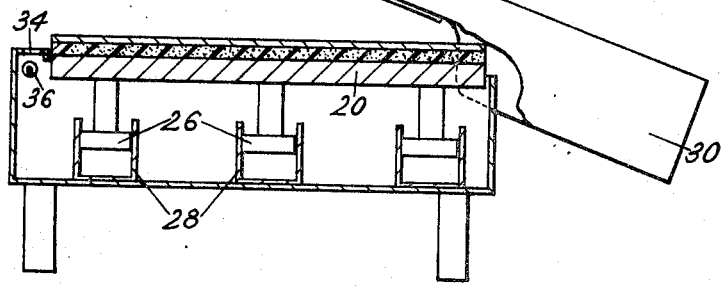
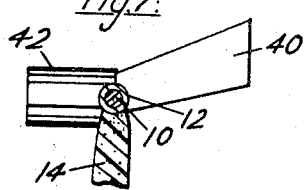 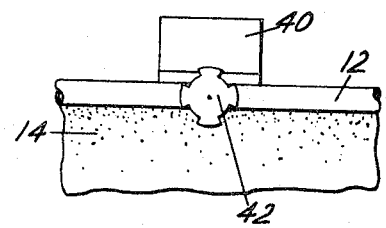

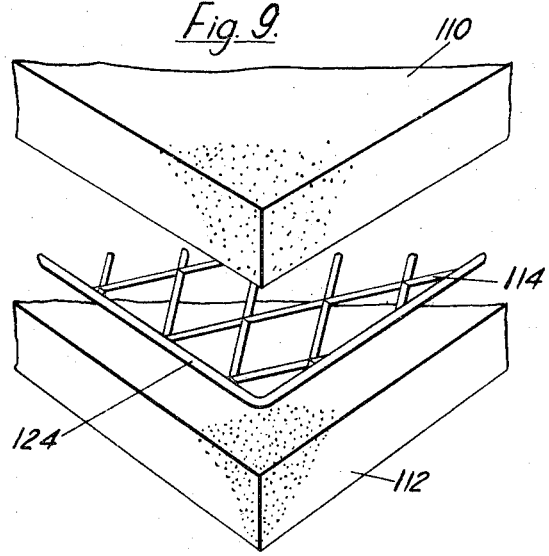
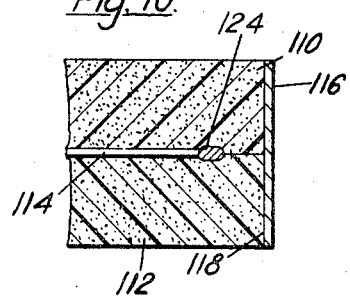
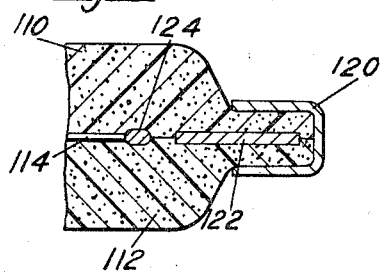

United States Patent Office 3,563,828
Patented Feb. 16, 1971

3,563,828
FLUID FILTERS
Dennis A. G. Marshall, Greets Cottage, Friday St.,
Warnham, near Horsham, Sussex, England
Filed June 14, 1968, Ser. No. 737,093
Int. Cl. B29c 25/00
U.S. Cl. 156—228                    3 Claims

ABSTRACT OF THE DISCLOSURE

A fluid filter for removing dust and other foreign matter from air and other fluid streams having a metal frame or a metal reinforcement which is bonded to one or more layers of filtering material by a coating of thermoplastic material, the coating being obtained by heating the frame or reinforcement and bringing it into contact with thermoplastic material in powder form, whereupon the powder melts and the filtering material is pressed against the coating while it is still molten.

---

This invention relates to fluid filters, particularly fluid filters for removing dust and other small solid particles from air-streams. The invention also relates to a method for making such filters.

The main object of the invention is to attach one or more layers of filtering material to a metal frame and/or reinforcement in a way which is both simple and effective.

Broadly, in a filter constructed in accordance with the invention, a metal frame and/or metal reinforcement is bonded to the layer or layers of filtering material by a coating of thermoplastic material produced by heating the frame and/or reinforcement and bringing it into contact with thermoplastic material in powder form.

The method for making such a filter in accordance with the invention includes the steps of heating the frame and/or reinforcement, causing its hot surface to come into contact with thermoplastic powder which adheres to the frame and/or reinforcement, the adhering powder thereby being brought into a molten state, and pressing the layer or layers of filtering material and the frame and/or reinforcement against one another while the thermoplastic coating hardens.

In one form of fluid filter in accordance with the invention, the frame is made of metal such as steel or aluminum alloy, and the coating is a synthetic plastic material such as polyethylene, polypropylene or cellulose acetate-butyrate. The filtering material can be a commercially-available random nylon fibre filter mat formed of unwoven fibres and having one face bonded discontinuously with latex or other bonding agent. In other words, the bonding agent does not form a continuous film which would then prevent the passage of fluid through the filter. Alternatively, the filtering material can comprise an openpore foam or sponge material, for example polyurethane foam, or a woven mat formed of polyvinylidine chloride filaments or strands which does not ignite or burn.

In the drawings:

FIG. 1 is a plan view of one form of fluid filter;
FIG. 2 is a section taken on the line II—II in FIG. 1;
FIG. 3 is a plan view of a second form of filter;
FIG. 4 is a section taken on the line IV—IV in FIG. 3;
FIG. 5 is a perspective view of apparatus for making the fluid filters shown in FIGS. 1 to 4;
FIG. 6 is a side view, with certain parts broken away and other parts in section, of the apparatus shown in FIG. 5;
FIG. 7 is a part-sectional view through a modification of the fluid filter shown in FIGS. 1 and 2;
FIG. 8 is an elevational view of the modified filter shown in FIG. 7;
FIG. 9 is an exploded view in perspective of part of a further form of filter;
FIG. 10 is a section through part of the filter shown in FIG. 9; and
FIG. 11 is a view similar to FIG. 10 showing a modification of the filter.

The filter shown in FIGS. 1 and 2 comprises a rectangular metal frame 10 made of rods or even thick wire which is coated with a plastic coating 12, the plastic preferably being polyethylene. This coating is applied during manufacture of the filter by heating the frame and then dipping it, while it is still hot, into polyethylene powder so that it is completely coated. The polyethylene is thus brought to a molten state as a result of its contact with the heated frame, and at this stage the coated frame is brought into contact with a random nylon fibre filter mat 14 or, alternatively, with a sheet of polyurethane foam material having open pores or a mat formed of woven strands of polyvinylidine chloride. The coated frame and the filter mat 14 are pressed together with the result that the filter mat is made to adhere to the liquid coating. The filter mat is therefore firmly attached to the frame once the coating has set, and the filter in its finished form has the shape and construction shown in FIGS. 1 and 2.

FIGS. 3 and 4 show a second form of filter in which the frame 10 is made of angle metal and has an expanded metal grid-work 16 placed across it before the frame is coated. The coating operation thus has the dual purpose of attaching a filtering material 14 to the frame and also of attaching the expanded metal grid-work 16 to the frame. After the frame and the expanded metal gridwork have been dipped in polyethylene powder, the random nylon fibre filter mat 14 is placed on to the metal gridwork 16 so that one face of the filter mat is bonded over part of its area to the expanded metal gridwork, while the peripheral portions of the mat are bonded to the surrounding frame. Thus, once the molten polyethylene has set, the filter mat is firmly bonded to the frame and to the metal gridwork, and the metal gridwork is equally firmly attached to the frame.

Where polyethylene is used for the coating on the frame will normally be brought to a temperature in the region of 240° C. and then dipped in polythylene powder. A certain amount of the polyethylene powder will thus adhere to the metal frame and will melt so as to form the required coating.

FIGS. 5 and 6 illustrate apparatus which can be used to produce the filters shown in FIGS. 1 to 4. The apparatus comprises a pair of platens 18 and 20, the upper platen 18 being pivotally mounted at 22 on the main frame of the apparatus. A pneumatic cylinder and piston 24 is pivotally connected between the main frame of the apparatus and the upper platen 18 so that the latter can be swung about the pivotal axis 22 towards and away from the lower platen 20.

Both platens are faced with a soft surface which takes the form of a layer of sponge rubber having a thin coating of glass fibre coated with polytetrafluoroethylene. It will also be noted from FIG. 6 that the lower platen 20 is connected to the pistons 26 of pneumatic cylinders 28 arranged beneath the platen. The hydraulic cylinders 28 are designed to work at a considerably higher pressure than the hydraulic cylinder 24 which raises and lowers the upper platen 18.

The apparatus is used by having one or more sheets of filtering material placed on the lower platen 20 while the upper platen is in the position shown in FIG. 5. The heated frames of the filters are then dipped in polyethylene powder and placed by hand or by automatic means on the layers of filtering material supported by the lower platen of the apparatus. A switch is then actuated so as to bring about the supply of compressed air to the pneumatic cylinder 24, with the result that the upper platen 18 is lowered on to the lower platen 20 at a comparatively slow speed which is controlled by an hydraulic dash-pot (not shown). The pressure applied by the pneumatic cylinder 24 to the upper platen 18 during this movement is fairly low so that, should the operator inadvertently trap his hand or any other part of his body between the two platens, the pressure exerted by the pneumatic cylinder 24 will be sufficiently low not to cause the operator any harm. It is also advantageous to provide a counterweight at the rear end 30 of the upper platen 18 so that it is nicely balanced.

Arranged near the front edge of the upper platen 18 are a pair of eyelets 32 which are arranged to enter holes 34 when the upper platen is brought face to face with the lower platen. Immediately after the eyelets 32 have entered the receiving holes 34, a switch is operated so as to supply compressed air to two small pneumatic cylinders 36 having axially-movable piston rods or bolts 38. These bolts enter the holes in the eyelets 32, thus locking the upper platen 18 securely in position. Once this has occurred compressed air is supplied to the pneumatic cylinders 28 beneath the lower platen 20, with the result that the lower platen is forced against the upper platen 18 under a pressure considerably in excess of that which can be exerted on the upper platen 18 by the pneumatic cylinder 24. The filters lying between the two platens are thus subjected to a moderate pneumatic pressure which is, however, cushioned by the layers of sponge material on the two opposing faces of the platens. The effect of the pressure on the filters is that the coating on the metal frames is moulded to a smooth shape, so that the filters have a finished appearance when the pneumatic pressure is released and the upper platen 18 is raised away from the lower platen 20. As in the case of downward movement of the platen 18, the speed with which the platen 18 moves upwards is controlled by the hydraulic dash-pot previously mentioned.

In some instances it may be desirable to provide the filters with a handle or other holding member, together with one or more spigots or other projections by which the filter can be secured in its position of use. Such a construction is shown in FIGS. 7 and 8 where the metal frame 10 of the filter has a handle 40 and a spigot 42 secured to it by injection moulding.

Although the specific filters described above are provided with random nylon fibre filter mats or with sheets of polyurethane foam, the invention extends to fluid filters having somewhat different forms of filtering material. Thus, filtering materials made, for example, of glass fibre or thickly woven strands of plastic or metal may also be attached to surrounding metal frames in the manner proposed above.

The filter shown in FIGS. 9 and 10 comprises two plies 110 and 112 demembraned polyurethane foam between which is sandwiched a metal reinforcing mesh 114 (demembraned foam is foam wherein the cells are in communication with each other). The foam material used for the two piles can be the same for both piles, or one of the piles can be made of a foam material having a different pore size or a different thickness from that of the other ply. It is not essential that the material of the piles be polyurethane foam as it is equally possible to use fibrous or woven filtering material such as glass fibre mats. The reinforcing mesh 114 will generally be made of steel or aluminium alloy.

The filter is made by heating the metal reinforcing mesh 114 to such a temperature that, when it is dipped in a thermoplastic powder or has the powder sprayed onto it, the powder melts and tends to form a liquid layer over the entire surface of the mesh. With the thermoplastic material in this molten condition, the mesh is placed between the two plies 110 and 112 as shown in FIG. 9 and the sandwich thus formed is placed within a press until the thermoplastic material has solidified. It will then be found that the mesh is firmly bonded by the thermoplastic material to the plies. Further, the mesh will be covered over almost its entire surface with a thin coating of thermoplastic material which protects the metal against rust or corrosion. This is of considerable importance where the filter is used to filter damp air or other gaseous fluids containing water in steam, vapour or droplet form.

The peripheral edges of the filter can be sealed in a number of ways. For example, a thin coating 116 of sealing compound can be applied to the peripheral edge 18 of the filter as shown in FIG. 10. Alternatively, the edge 18 can be sealed by a bonded synthetic plastic strip which takes the same position as the coating 116. Another possibility is for the opposed edges of the plies 110 and 112 outside or beyond the mesh to be bonded together by an adhesive. Yet another scheme is to compress the peripheral edge within a U-section marginal strip 120 made of metal or of rigid synthetic plastic material as shown in FIG. 11. Where this scheme is adopted, it will usually be necessary either to ensure that the reinforcing mesh extends right up to the strip 120, or else to provide a reinforcing strip 122 between the marginal portions of the plies 110 and 112. The strip 122 is preferably made of a synthetic plastic material such as polyvinylchloride (PVC) or nylon so that the plies 110 and 112 can then easily be bonded to the strip by R.F. or H.F. welding.

The precise construction of the reinforcing mesh 114 is not at all critical, but it will usually be formed of criss-crossing wires, rods or strips having a border 124 of somewhat heavier gauge metal.

I claim:

1. A method of making an air filter having a planar layer of filtering material with a metal peripheral frame surrounding and supporting said filtering material layer over the entire peripheral portion of the latter, the peripheral frame having a coating of thermoplastic material peripherally bonding said filtering material layer, which method includes the steps of:

(A) heating said metal peripheral frame by itself to a temperature above that at which the said thermoplastic material melts;
   (B) contacting the hot surface of the metal frame with thermoplastic powder to form a molten coating thereon;
   (C) bringing the metal frame with the thermoplastic coating thereon still in molten form into peripheral contact with the layer of filtering material being supported on a lower platen of a press to bond the filter layer to the frame, said press having relatively movable upper and lower platens each of which is faced with a layer of resilient sponge material provided with an outer coating comprising glass fibre;
   (D) thereafter moving the upper platen towards the lower platen and locking one of the platens in a position close to the other; and
   (E) pressing the unlocked platen against the said locked platen by applying a moderate pneumatic pressure thereto, the said pressure being applied for a predetermined period of time so that the coating is molded to a smooth finish.

2. A method of making a filter as claimed in claim 1, in which said thermoplastic powder for forming a molten coating is a thermoplastic material selected from the group consisting of polyethylene, polypropylene and cellulose acetate-butyrate.

3. A method of making a filter as claimed in claim 1, in which said filtering material comprises at least one layer of filtering material selected from the group consisting of open-pore foam material, random fibre mat material, and mat material of woven polyvinylidine chloride strands.

References Cited

UNITED STATES PATENTS

| | | | |
|---|---|---|---|
| 2,726,707 | 12/1955 | Wellons et al. | 100—257UX |
| 3,271,214 | 9/1966 | Tabor | 156—583X |
| 3,183,285 | 5/1965 | Boylan | 55—490X |
| 3,388,536 | 6/1968 | Nash | 55—492 |

FOREIGN PATENTS

| | | | |
|---|---|---|---|
| 697,913 | 11/1964 | Canada | 55—490 |
| 909,894 | 11/1962 | Great Britain | 55—524 |
| 1,097,917 | 1/1968 | Great Britain | 55—524UX |

FRANK W. LUTTER, Primary Examiner

B. NOZICK, Assistant Examiner

U.S. Cl. X.R.

55—514, 528; 156—283, 293, 295, 321; 264—134, 257